(12) United States Patent
Rodehorst

(10) Patent No.: US 11,958,573 B2
(45) Date of Patent: Apr. 16, 2024

(54) KAYAK RACK

(71) Applicant: Theodore George Rodehorst, Los Gatos, CA (US)

(72) Inventor: Theodore George Rodehorst, Los Gatos, CA (US)

(*) Notice: Subject to any disclaimer, the term of this patent is extended or adjusted under 35 U.S.C. 154(b) by 468 days.

(21) Appl. No.: 17/482,321

(22) Filed: Sep. 22, 2021

(65) Prior Publication Data

US 2022/0097806 A1 Mar. 31, 2022

Related U.S. Application Data

(60) Provisional application No. 63/084,837, filed on Sep. 29, 2020.

(51) Int. Cl.
*B63B 34/26* (2020.01)
*A01K 97/10* (2006.01)

(52) U.S. Cl.
CPC ............ *B63B 34/26* (2020.02); *A01K 97/10* (2013.01)

(58) Field of Classification Search
CPC ........ A01K 97/10; A01K 97/22; B63B 21/56; B63B 25/002; B63B 32/77; B63B 34/26; B63B 11/02; B63B 2011/024; F16M 13/022; Y10S 224/922; Y10S 269/907; Y10S 81/01
USPC ............................................ 224/406; 43/21.2
See application file for complete search history.

(56) References Cited

U.S. PATENT DOCUMENTS 4,527,349 A * 7/1985 Emory, Jr. ............ A01K 97/10
248/513
4,763,435 A * 8/1988 Deering ................. A01K 97/10
43/21.2
5,435,093 A * 7/1995 Minorics ............... A01K 97/10
43/21.2
5,533,295 A * 7/1996 Hochberger .......... A01K 97/10
248/512
5,673,507 A * 10/1997 Stokes, Jr. ............. A01K 97/10
114/364
6,796,078 B1 * 9/2004 Bowman ............... A01K 97/10
248/512

(Continued)

FOREIGN PATENT DOCUMENTS

IT 201800009516 A1 * 4/2020

OTHER PUBLICATIONS

IT 201800009516 A1 Translation, Tessari, Apr. 19, 2020 (Year: 2020).*

*Primary Examiner* — Nathan J Newhouse
*Assistant Examiner* — Matthew T Theis
(74) *Attorney, Agent, or Firm* — Craig A. Simmermon

(57) ABSTRACT

A kayak rack or structure that is reversibly attachable to a kayak and used to help carry, stow, or attach articles to the kayak. Kayak rack includes two support arms or support beams that are flexibly attached together with a special flexible support coupling that allows the two support arms or support beams to pivot relative to each other but still keeps the two support arms or support beams permanently attached together, along with an angled stanchion rigidly attached to each support arm or support beam, wherein each angled stanchion is angled at the precise angle required to mate with and reversibly rigidly attach to an existing, original equipment manufacturer's fishing rod holder that is built into the kayak.

5 Claims, 8 Drawing Sheets

(56) References Cited

U.S. PATENT DOCUMENTS

| | | | | |
|---|---|---|---|---|
| 7,530,324 B2* | 5/2009 | Salerno | ............... | A01K 97/10 |
| | | | | 114/364 |
| 9,282,732 B2* | 3/2016 | Henry, Jr. | ............... | A01K 97/10 |
| 9,485,978 B1* | 11/2016 | Allen, Jr. | ............... | A01K 97/10 |
| 2005/0102881 A1* | 5/2005 | Legendziewicz | ...... | A01K 97/10 |
| | | | | 43/21.2 |
| 2008/0121777 A1* | 5/2008 | Aggus | ............... | A01K 97/10 |
| | | | | 248/528 |

* cited by examiner

KAYAK RACK

CROSS-REFERENCE TO RELATED APPLICATIONS

The instant application claims the benefit of priority to U.S. Provisional Patent Application Ser. No. 63/084,837, filed on Sep. 29, 2020, entitled "Watercraft Accessory Device that can be installed using only hands and without tools, hardware, mechanical knowledge/capability, or modifications to the watercraft, and can be used for a plurality of purposes that include holding fishing rods at a trolling angle nearer parallel than vertical to the water, and to provide a plurality of places to store/organize/manage/mount equipment", which is hereby incorporated by reference herein.

BACKGROUND OF THE INVENTION

1. Field of the Invention

This invention relates to kayak racks or structures that are reversibly attachable to a kayak that are used to help carry, stow, or attach articles to the kayak. The kayak rack of this invention includes two support arms or support beams that are flexibly attached together with a special flexible support coupling that allows the two support arms or support beams to pivot relative to each other but still keeps the two support arms or support beams permanently attached together, along with an angled stanchion rigidly attached to each support arm or support beam, wherein each angled stanchion is angled at the precise angle required to mate with and reversibly rigidly attach to an existing, original equipment manufacturer's fishing rod holder that is built into the kayak.

2. Description of Related Art

There are many other kayak racks in the prior art however there are none with the special flexible support coupling connecting two support arms or support beams that are each rigidly attached to an angled stanchion that is precisely angled to be inserted into, and reversibly rigidly attach to, two existing, original equipment manufacturer's fishing rod holders that are built into the kayak.

BRIEF SUMMARY OF THE INVENTION

It is an aspect of kayak rack to reversibly attach to a kayak through two existing, original equipment manufacturer's fishing rod holders that are built into the kayak.

It is an aspect of kayak rack to reversibly attach to a kayak without the use of any tools or extraneous equipment.

It is an aspect of kayak rack to be removed from a kayak without the use of any tools or extraneous equipment.

It is an aspect of kayak rack to retain and hold a fishing rod for fishing purposes.

It is an aspect of kayak rack to retain and hold a fishing rod for storage purposes.

It is an aspect of kayak rack to include a special flexible support coupling to flexibly connect the left side of the kayak rack to the right side of the kayak rack.

DEFINITION LIST

Figure 1:
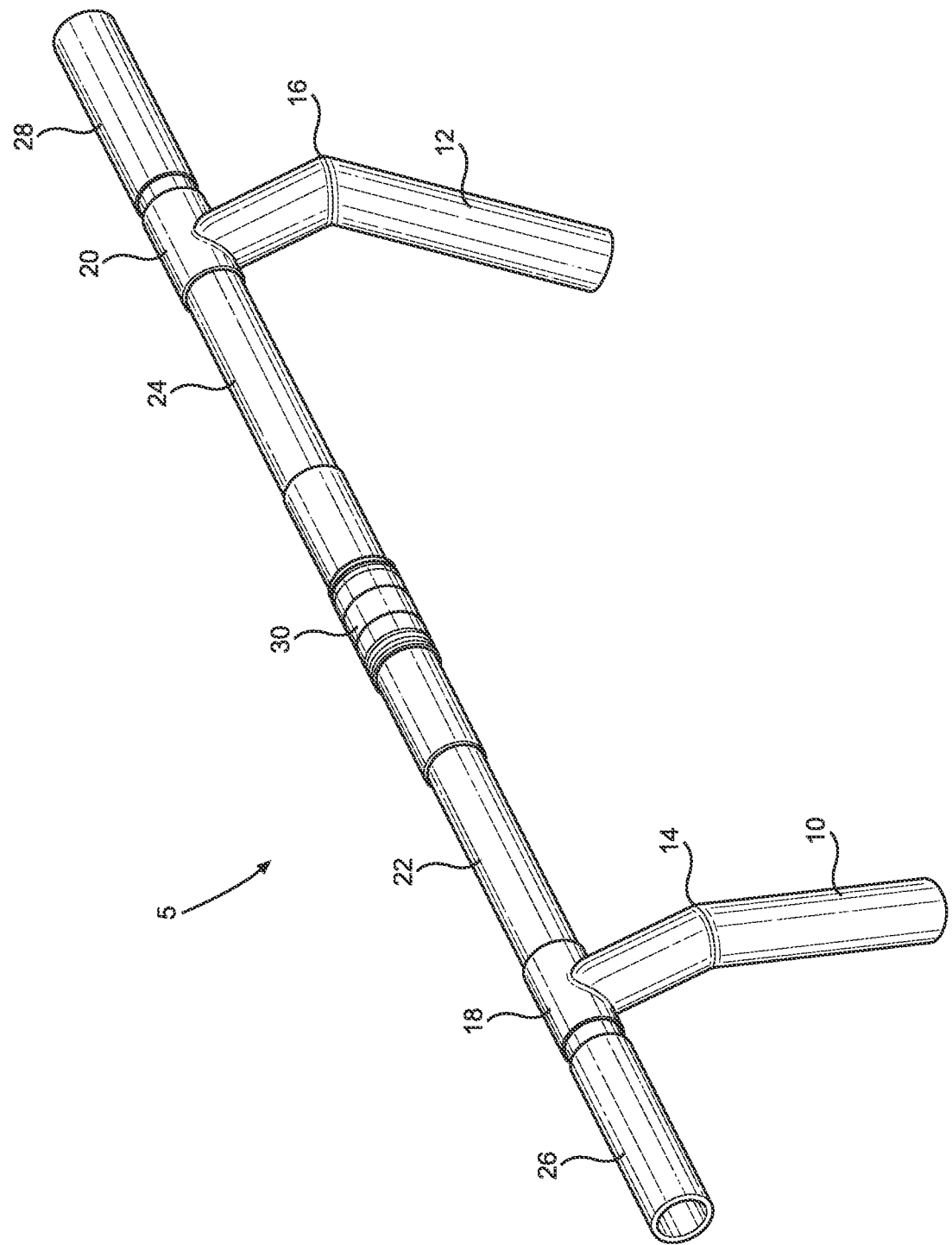
FIG. 1 is perspective view of a first embodiment of a kayak rack.
Figure 2:
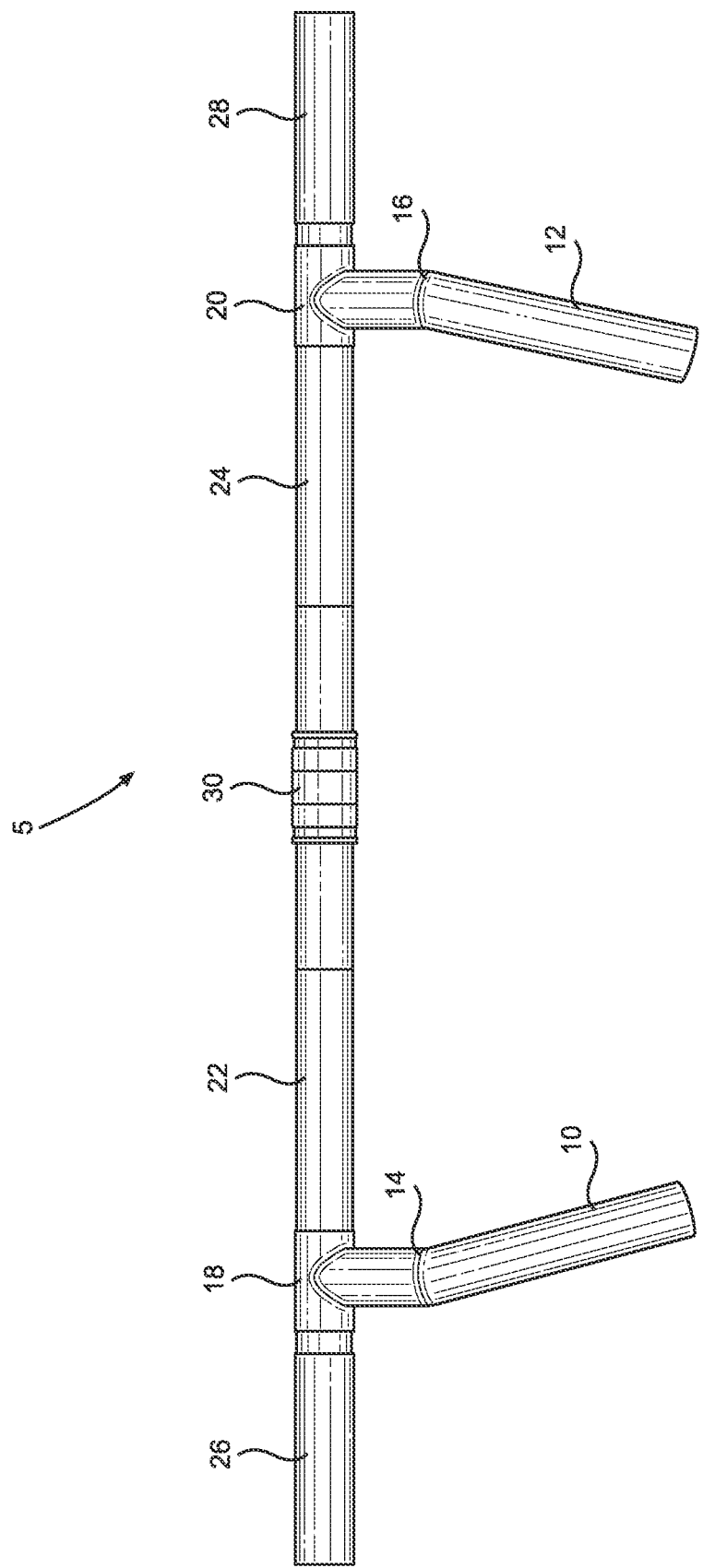
FIG. 2 is a rear elevation view of a first embodiment of kayak rack.

| Term | Definition |
|---|---|
| 5 | Kayak Rack |
| 10 | First Stanchion Section |
| 12 | Second Stanchion Section |
| 14 | First Elbow Section |
| 16 | Second Elbow Section |
| 18 | First T Section |
| 20 | Second T Section |
| 22 | First Inner Support Beam Section |
| 24 | Second Inner Support Beam Section |
| 26 | First Outer Support Beam Section |
| 28 | Second Outer Support Beam Section |
| 30 | Flexible Support Coupling |
| 32 | First Fishing Reel Slot |
| 34 | Second Fishing Reel Slot |
| 36 | First Storage Cup |
| 38 | Second Storage Cup |
| 40 | Third Storage Cup |
| 42 | Fourth Storage Cup |
| 44 | Flared or Enlarged Rim |
| 46 | Storage Reel Slot |
| 100 | Fishing Pole in Use |
| 110 | Fishing Pole in Storage |
| 120 | Kayak |
| 122 | Left Fishing Rod Holder on Kayak |
| 124 | Right Fishing Rod Holder on Kayak |

DETAILED DESCRIPTION OF THE INVENTION

Kayak rack 5 comprises: a first stanchion section 10; a second stanchion section 12; a first elbow section 14; a second elbow section 16; a first T section 18; a second T section 20; a first inner support beam section 22, a second inner support beam section 24; a first outer support beam section 26; a second outer support beam section 28; and a flexible support coupling 30.

First stanchion section 10 is a rigid cylindrical member. First stanchion section 10 may be hollow or solid. First stanchion section 10 has a first end, a second end, an outer diameter, an outer surface, a length, and a longitudinal axis.

The outer diameter of first stanchion section 10 is about 0.5 to 5 inches. The length of first stanchion section 10 is about 2 to 20 inches. The longitudinal axis of first stanchion section 10 runs from the first end to the second end. First stanchion section 10 may be made of any known material such as: metal, steel, aluminum, polymer, plastic, composite, wood, fiberglass, ceramic, carbon fiber, or any other known material.

Second stanchion section 12 is a rigid cylindrical member. Second stanchion section 12 may be hollow or solid. Second stanchion section 12 has a first end, a second end, an outer diameter, an outer surface, a length, and a longitudinal axis.

The outer diameter of second stanchion section 12 is about 0.5 to 5 inches. The length of second stanchion section 12 is about 2 to 20 inches. The longitudinal axis of second stanchion section 12 runs from the first end to the second end. Second stanchion section 12 may be made of any known material such as: metal, steel, aluminum, polymer, plastic, composite, wood, fiberglass, ceramic, carbon fiber, or any other known material.

First elbow section 14 is a rigid elbow-shaped or bent cylindrical member that is angled at a 30 to 60 degree angle. First elbow section 14 may be hollow or solid. First elbow section 14 has a first segment, a first segment outer diameter, a first segment length, a first segment longitudinal axis, a second segment, a second segment outer diameter, a second segment length, and a second segment longitudinal axis. The first segment of the first elbow section 14 has a first end and a second end. The first segment outer diameter of first elbow section 14 is equal to the second segment outer diameter of first elbow section 14 and is about 0.5 to 5 inches. The first segment length of first elbow section 14 is about 1-10 inches. The second segment of the first elbow section 14 has a first end and a second end. The second end length of first elbow section 14 is about 1-10 inches. First elbow section 14 may be made of any known material such as: metal, steel, aluminum, polymer, plastic, composite, wood, fiberglass, ceramic, carbon fiber, or any other known material. The second end of the first segment of the first elbow section 14 is rigidly attached to or connected to the first end of the second segment of the first elbow section 14 so that the longitudinal axis of the first segment is at a 30-60 degree angle with that of the second segment. Rigid attachment may be accomplished by any known means such as: weld, glue, epoxy, adhesive, clamps, hose clamps, bolts, screws, rivets, clips, snaps, pins, or fasteners. In best mode, first segment and second segment are integral or monolithic and made from the same piece of material.

Second elbow section 16 is a rigid elbow-shaped or bent cylindrical member that is angled at a 30 to 60 degree angle. Second elbow section 16 may be hollow or solid. Second elbow section 16 has a first segment, a first segment outer diameter, a first segment length, a first segment longitudinal axis, a second segment, a second segment outer diameter, a second segment length, and a second segment longitudinal axis. The first segment of the second elbow section 16 has a first end and a second end. The first segment outer diameter of second elbow section 16 is equal to the second segment outer diameter of second elbow section 16 and is about 0.5 to 5 inches. The first segment length of second elbow section 16 is about 1-10 inches. The second segment of the second elbow section 16 has a first end and a second end. The second end length of second elbow section 16 is about 1-10 inches. Second elbow section 16 may be made of any known material such as: metal, steel, aluminum, polymer, plastic, composite, wood, fiberglass, ceramic, carbon fiber, or any other known material. The second end of the first segment of the second elbow section 16 is rigidly attached to or connected to the first end of the second segment of the second elbow section 16 so that the longitudinal axis of the first segment is at a 30-60 degree angle with the second segment. Rigid attachment may be accomplished by any known means such as: weld, glue, epoxy, adhesive, clamps, hose clamps, bolts, screws, rivets, clips, snaps, pins, or fasteners. In best mode, first segment and second segment are integral or monolithic and made from the same piece of material.

The second end of the first stanchion section 10 is rigidly attached to or connected to the first end of the first segment of the first elbow section 14 so that the longitudinal axis of the first stanchion section 10 is parallel and coincident with that of the first segment of the first elbow section 14. Rigid attachment may be accomplished by any known means such as: weld, glue, epoxy, adhesive, clamps, hose clamps, bolts, screws, rivets, clips, snaps, pins, or fasteners. In best mode, first stanchion section 10 and first elbow section 14 are integral or monolithic and made from the same piece of material. As discussed below, the first end of the first stanchion section 10 is inserted into an existing, original equipment manufacturer's left fishing rod holder 122 that is built into the kayak 120 in order to properly reversibly attach the kayak rack 5 to the kayak 120.

The second end of the second stanchion section 12 is rigidly attached to or connected to the first end of the first segment of the second elbow section 16 so that the longitudinal axis of the second stanchion section 12 is parallel and coincident with that of the first segment of the second elbow section 16. Rigid attachment may be accomplished by any known means such as: weld, glue, epoxy, adhesive, clamps, hose clamps, bolts, screws, rivets, clips, snaps, pins, or fasteners. In best mode, first stanchion section 10 and first elbow section 14 are integral or monolithic and made from the same piece of material. As discussed below, the first end of the first stanchion section 10 is inserted into an existing, original equipment manufacturer's right fishing rod holder 124 that is built into the kayak 120 in order to properly reversibly attach the kayak rack 5 to the kayak 120.

First T section 18 is a rigid T-shaped member. First T section 18 has a base segment, a first segment, and a second segment. The base segment is the bottom end or base end of the T-shape. The first and second segments are the upper ends of the T-shape. The base segment of the first T section 18 is a rigid cylindrical member with a first end, a second end, an outer diameter, an outer surface, a length, and a longitudinal axis. The base segment may be hollow or solid. The outer diameter of the base segment of the first T section 18 is about 0.5 to 5 inches. The length of the base segment of the first T section 18 is about 1-10 inches. The first segment of the first T section 18 is a rigid cylindrical member with a first end, a second end, an outer diameter, an outer surface, a length, and a longitudinal axis. The first segment may be hollow or solid. The outer diameter of the first segment of the first T section 18 is about 0.5 to 5 inches. The length of the first segment of the first T section 18 is about 1-10 inches. The second segment of first T section 18 is a rigid cylindrical member with a first end, a second end, an outer diameter, an outer surface, a length, and a longitudinal axis. The second segment may be hollow or solid. The outer diameter of the second segment of the first T section 18 is about 0.5 to 5 inches. The length of the second segment of the first T section 18 is about 1-10 inches. First T section 18 may be made of any known material such as: metal, steel, aluminum, polymer, plastic, composite, wood, fiberglass, ceramic, carbon fiber, or any other known material. The second end of the first segment of the first T section 18 is rigidly attached to or connected to the first end of the second segment of the first T section 18 so that their longitudinal axes are parallel and coincident with each other. This point of connection is the mid-point of the first T section 18. Rigid attachment may be accomplished by any known means such as: weld, glue, epoxy, adhesive, clamps, hose clamps, bolts, screws, rivets, clips, snaps, pins, or fasteners. In best mode, first segment and second segment are integral or monolithic and made from the same piece of material. The second end of the base segment of the first T section 18 is rigidly attached to or connected to the mid-point so that the longitudinal axis of the base segment of the first T section 18 is perpendicular to the longitudinal axes of the first and second segments of the first T section 18 to form the rigid T-shaped cylindrical member. Rigid attachment may be accomplished by any known means such as: weld, glue, epoxy, adhesive, clamps, hose clamps, bolts, screws, rivets, clips, snaps, pins, or fasteners. In best mode, first segment and second segment are integral or monolithic and made from the same piece of material.

Second T section 20 is a rigid T-shaped member. Second T section 20 has a base segment, a first segment, and a second segment. The base segment is the bottom end or base end of the T-shape. The first and second segments are the upper ends of the T-shape. The base segment of the second T section 20 a rigid cylindrical member with a first end, a second end, an outer diameter, an outer surface, a length, and a longitudinal axis. The base segment may be hollow or solid. The outer diameter of the base segment of the second T section 20 is about 0.5 to 5 inches. The length of the base segment of the second T section 20 is about 1-10 inches. The first segment of the second T section 20 a rigid cylindrical member with a first end, a second end, an outer diameter, an outer surface, a length, and a longitudinal axis. The first segment may be hollow or solid. The outer diameter of the first segment of the second T section 20 is about 0.5 to 5 inches. The length of the first segment of the second T section 20 is about 1-10 inches. The second segment of second T section 20 a rigid cylindrical member with a first end, a second end, an outer diameter, an outer surface, a length, and a longitudinal axis. The second segment may be hollow or solid. The outer diameter of the second segment of the second T section 20 is about 0.5 to 5 inches. The length of the second segment of the second T section 20 is about 1-10 inches. Second T section 20 may be made of any known material such as: metal, steel, aluminum, polymer, plastic, composite, wood, fiberglass, ceramic, carbon fiber, or any other known material. The second end of the first segment of the second T section 20 is rigidly attached to or connected to the first end of the second segment of the second T section 20 so that their longitudinal axes are parallel and coincident with each other. This point of connection is the mid-point of the second T section 20. Rigid attachment may be accomplished by any known means such as: weld, glue, epoxy, adhesive, clamps, hose clamps, bolts, screws, rivets, clips, snaps, pins, or fasteners. In best mode, first segment and second segment are integral or monolithic and made from the same piece of material. The second end of the base segment of the second T section 20 is rigidly attached to or connected to the mid-point so that the longitudinal axis of the base segment of the second T section 20 is perpendicular to the longitudinal axes of the first and second segments of the second T section 20 to form the rigid T-shaped cylindrical member. Rigid attachment may be accomplished by any known means such as: weld, glue, epoxy, adhesive, clamps, hose clamps, bolts, screws, rivets, clips, snaps, pins, or fasteners. In best mode, first segment and second segment are integral or monolithic and made from the same piece of material.

The second end of the second segment of first elbow section 14 is rigidly attached to or connected to the first end of the base segment of the first T section 18 so that the longitudinal axis of the second segment of first elbow section 14 is parallel and coincident with the longitudinal axis of the base segment of the first T section 18 and the longitudinal axis of the first segment of the first elbow section 14 forms an acute angle with the longitudinal axis of the first segment of the second elbow section 16. In other words, the first elbow section 14 is rotated so that its first segment makes an acute angle with the first segment of the second elbow section 16. The longitudinal axis of the attached first stanchion section 10 is coincident and parallel with the longitudinal axis of the first segment of the first elbow section 14, so the longitudinal axis of the attached first stanchion section 10 is parallel and coincident with the longitudinal axis of the base segment of the first T section 18 and forms an acute angle with the longitudinal axis of the first segment of the second elbow section 16. As discussed below, the acute angle relationship or positioning between the first stanchion section 10 and the second stanchion section 12 is critical to the method of reversible attachment of the kayak rack 5 to the kayak 120. Rigid attachment may be accomplished by any known means such as: weld, glue, epoxy, adhesive, clamps, hose clamps, bolts, screws, rivets, clips, snaps, pins, or fasteners. In best mode, first, second, and third segments are integral or monolithic and made from the same piece of material.

The second end of the second segment of second elbow section 16 is rigidly attached to or connected to the first end of the base segment of the second T section 20 so that the longitudinal axis of the second segment of second elbow section 16 is parallel and coincident with the longitudinal axis of the base segment of the second T section 20 and the longitudinal axis of the first segment of the second elbow section 16 forms an acute angle with the longitudinal axis of the first segment of the first elbow section 14. In other words, the second elbow section 16 is rotated so that its first segment makes an acute angle with the first segment of the first elbow section 14. The longitudinal axis of the attached second stanchion section 12 is coincident and parallel with the longitudinal axis of the first segment of the second elbow section 16, so the longitudinal axis of the attached second stanchion section 12 is parallel and coincident with the longitudinal axis of the base segment of the second T section 20 and forms an acute angle with the longitudinal axis of the first segment of the first elbow section 14. As discussed below, the acute angle relationship or positioning between the first stanchion section 10 and the second stanchion section 12 is critical to the method of reversible attachment of the kayak rack 5 to the kayak 120. Rigid attachment may be accomplished by any known means such as: weld, glue, epoxy, adhesive, clamps, hose clamps, bolts, screws, rivets, clips, snaps, pins, or fasteners. In best mode, first, second, and third segments are integral or monolithic and made from the same piece of material.

Many kayaks 120 come with at least one left fishing rod holder 122 and at least one right fishing rod holder 124. The left fishing rod holder 122 is located on the left side of the seat on the kayak 120. The right fishing rod holder 124 is located on the right side of the seat on the kayak 120. Typically, there is one left fishing rod holder 122 and one right fishing rod holder 124 for each seat in the kayak. Each fishing rod holder 122,124 is a cylinder, cylindrical socket, or hollow shaped cylindrical member. Each fishing rod holder 122,124 has an upper end, a lower end, an inner diameter, a length, and a longitudinal axis. The upper end of each fishing rod holder 122,124 is open. The lower end of each fishing rod holder 122,124 is closed and integral to the sides of each fishing rod holder 122,124. The longitudinal axis of each fishing rod holder 122,124 runs from the lower end to the upper end of each fishing rod holder 122,124. The longitudinal axis of each left fishing rod holder 122 points generally upwards, however the longitudinal axis is also tilted slightly backwards or away from the seat on the kayak 120 and the longitudinal axis is also tilted slightly towards the water or the left side of the kayak 120. The longitudinal axis of each right fishing rod holder 124 points generally upwards, however the longitudinal axis is also tilted slightly backwards or away from the seat on the kayak 120 and the longitudinal axis is also tilted slightly towards the water or the right side of the kayak 120. Therefore, the longitudinal axis of each left fishing rod holder 122 is not parallel with the longitudinal axis of each right fishing rod holder 124. The longitudinal axis of each left fishing rod holder 122 forms an acute angle with the longitudinal axis of each right fishing rod holder 124. Thus, the longitudinal axes of each pair of left and right fishing rod holders 122,124 form an acute angle with each other. Generally, the longitudinal axes of each left fishing rod holder 122 are parallel with each other and the longitudinal axes of each right fishing rod holder 124 are parallel with each other.

Please note that the kayak 120, each left fishing rod holder 122, and each right fishing rod holder 124 are not a component of this invention. The kayak rack 5 of this invention is reversibly attachable to the left fishing rod holder 122 and right fishing rod holder 124 of a kayak. The left fishing rod holder 122 and right fishing rod holder 124 are existing, original equipment manufacturer's components on a kayak 120 and not a part of this invention.

The longitudinal axis of the first stanchion section 10 and the longitudinal axis of the second stanchion section 12 must form an acute angle with each other to allow for proper reversible attachment of the kayak rack 5 to a kayak 120 because the existing, original equipment manufacturer's left fishing rod holder 122 forms an acute angle with the existing, original equipment manufacturer's right fishing rod holder 124 wherein the first stanchion section 10 and the second stanchion section 12 must exactly match this angle in order to properly slide into the existing, original equipment manufacturer's left fishing rod holder 122 and the existing, original equipment manufacturer's right fishing rod holder 124, respectively. If the longitudinal axis of the first stanchion section 10 and the longitudinal axis of the second stanchion section 12 are parallel or are at an obtuse angle to each other, then the first stanchion section 10 and the second stanchion section 12 will not properly slide into the existing, original equipment manufacturer's left fishing rod holder 122 and the existing, original equipment manufacturer's right fishing rod holder 124, respectively. The fact that the longitudinal axis of the first stanchion section 10 and the longitudinal axis of the second stanchion section 12 are not parallel allows the kayak rack 5 to more stably and securely attach to the kayak 120 by the reversible attachment method taught by this invention. The reversible attachment method taught by this invention is a special reversible attachment method that is done by hand and is extremely sturdy, stable, and rugged but yet does not require any tools, fasteners, hardware, mechanical knowledge/capability, or modifications to the watercraft in order to complete the attachment of the kayak rack 5 and does not require any tools, fasteners, hardware, mechanical knowledge/capability, or modifications to the watercraft to remove the kayak rack 5.

First inner support beam section 22 is a rigid cylindrical member. First inner support beam section 22 may be hollow or solid. First inner support beam section 22 has a first end, a second end, an outer diameter, an outer surface, a length, and a longitudinal axis. The outer diameter of first inner support beam section 22 is about 0.5 to 5 inches. The length of first inner support beam section 22 is about 5 to 50 inches. The longitudinal axis of first inner support beam section 22 runs from the first end to the second end. First inner support beam section 22 may be made of any known material such as: metal, steel, aluminum, polymer, plastic, composite, wood, fiberglass, ceramic, carbon fiber, or any other known material.

Second inner support beam section 24 is a rigid cylindrical member. Second inner support beam section 24 may be hollow or solid. Second inner support beam section 24 has a first end, a second end, an outer diameter, an outer surface, a length, and a longitudinal axis. The outer diameter of second inner support beam section 24 is about 0.5 to 5 inches and is equal to that of the first inner support beam section 22. The length of second inner support beam section 24 is about 5 to 50 inches and is equal to that of the first inner support beam section 22. The longitudinal axis of second inner support beam section 24 runs from the first end to the second end. Second inner support beam section 24 may be made of any known material such as: metal, steel, aluminum, polymer, plastic, composite, wood, fiberglass, ceramic, carbon fiber, or any other known material.

The first end of the first inner support beam section 22 is rigidly attached to or connected to the second end of the second segment of the first T section 18 so that the longitudinal axis of the first inner support beam section 22 is parallel and coincident with that of the second segment of the first T section 18. Rigid attachment may be accomplished by any known means such as: weld, glue, epoxy, adhesive, clamps, hose clamps, bolts, screws, rivets, clips, snaps, pins, or fasteners.

The second end of the second inner support beam section 24 is rigidly attached to or connected to the first end of the first segment of the second T section 20 so that the longitudinal axis of the second inner support beam section 24 is parallel and coincident with that of the first segment of second T section 20. Rigid attachment may be accomplished by any known means such as: weld, glue, epoxy, adhesive, clamps, hose clamps, bolts, screws, rivets, clips, snaps, pins, or fasteners.

First outer support beam section 26 is a rigid cylindrical member. First outer support beam section 26 may be hollow or solid. First outer support beam section 26 has a first end, a second end, an outer diameter, an outer surface, a length, and a longitudinal axis. The outer diameter of first outer support beam section 26 is about 0.5 to 5 inches. The length of first outer support beam section 26 is about 5 to 50 inches. The longitudinal axis of first outer support beam section 26 runs from the first end to the second end. First outer support beam section 26 may be made of any known material such as: metal, steel, aluminum, polymer, plastic, composite, wood, fiberglass, ceramic, carbon fiber, or any other known material.

Second outer support beam section 28 is a rigid cylindrical member. Second outer support beam section 28 may be hollow or solid. Second outer support beam section 28 has a first end, a second end, an outer diameter, an outer surface, a length, and a longitudinal axis. The outer diameter of second outer support beam section 28 is about 0.5 to 5 inches. The length of second outer support beam section 28 is about 5 to 50 inches. The longitudinal axis of second outer support beam section 28 runs from the first end to the second end. Second outer support beam section 28 may be made of any known material such as: metal, steel, aluminum, polymer, plastic, composite, wood, fiberglass, ceramic, carbon fiber, or any other known material.

The second end of the first outer support beam section 26 is rigidly attached to or connected to the first end of the first segment of the first T section 18 so that the longitudinal axis of the first outer support beam section 26 is parallel and coincident with that of the first segment of the first T section 18.

Rigid attachment may be accomplished by any known means such as: weld, glue, epoxy, adhesive, clamps, hose clamps, bolts, screws, rivets, clips, snaps, pins, or fasteners.

The first end of the second outer support beam section 26 is rigidly attached to or connected to the second end of the second segment of the second T section 20 so that the longitudinal axis of the second outer support beam section 28 is parallel and coincident with that of the second segment of the second T section 20.

Rigid attachment may be accomplished by any known means such as: weld, glue, epoxy, adhesive, clamps, hose clamps, bolts, screws, rivets, clips, snaps, pins, or fasteners.

Flexible support coupling 30 is a hollow flexible cylindrical member. Flexible support coupling 30 has a first end, a second end, a mid-point, an inner diameter, an outer diameter, a length, and a longitudinal axis. The first end of flexible support coupling 30 is open. The second end of flexible support coupling 30 is open. The inner diameter of flexible support coupling 30 is sized to make a slip fit or press fit with the outer diameter of the first and second inner support beam sections 22,24. The outer diameter flexible support coupling 30 is about 0.5 to 5 inches. The length of flexible support coupling 30 is about 2.0 to 20 inches. The longitudinal axis of flexible support coupling 30 runs from the first end to the second end of flexible support coupling 30. The mid-point of flexible support coupling 30 is the longitudinal bisect of the flexible support coupling 30 or the center of the flexible support coupling 30 in between the first end and the second end of the flexible support coupling 30.

The first end of the flexible support coupling 30 is rigidly attached to or connected to the second end of first inner support beam section 22 so that the longitudinal axis of flexible support coupling 30 is parallel and coincident with that of the first inner support beam section 22. Rigid attachment may be accomplished by any known means such as: weld, glue, epoxy, adhesive, clamps, hose clamps, bolts, screws, rivets, clips, snaps, pins, or fasteners.

Figure 3:
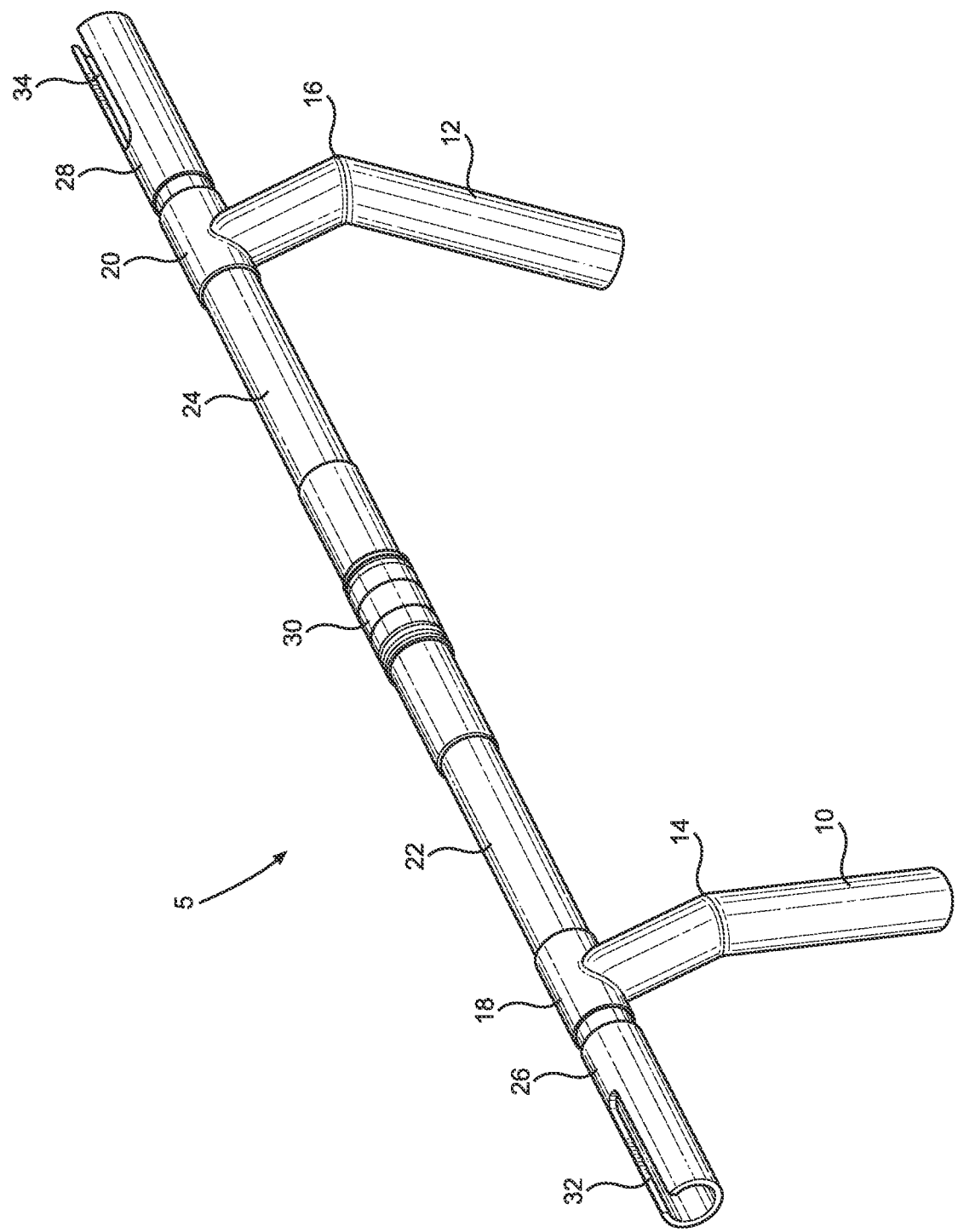
FIG. 3 is perspective view of a second embodiment of a kayak rack.
Figure 4:
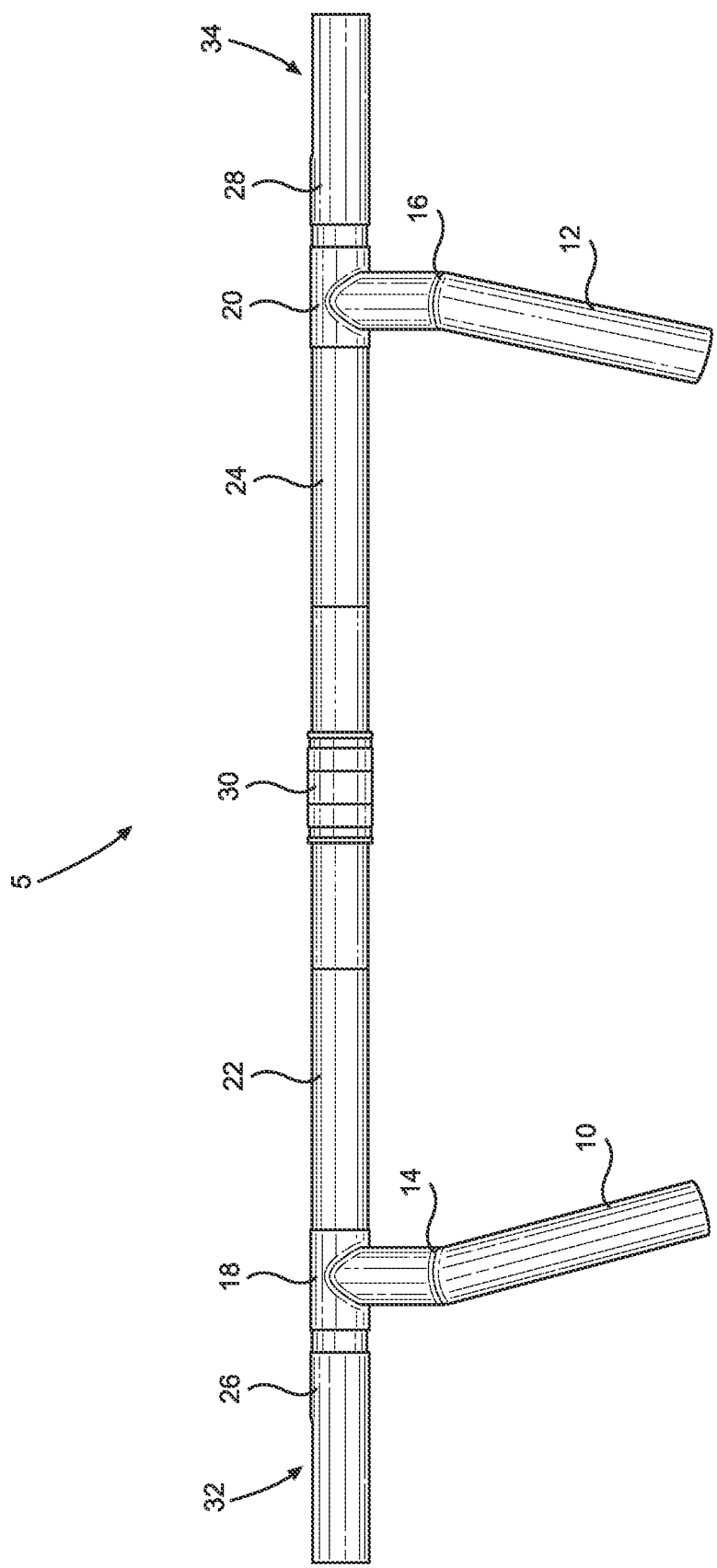
FIG. 4 is a rear elevation view of a second embodiment of kayak rack.
Figure 5:
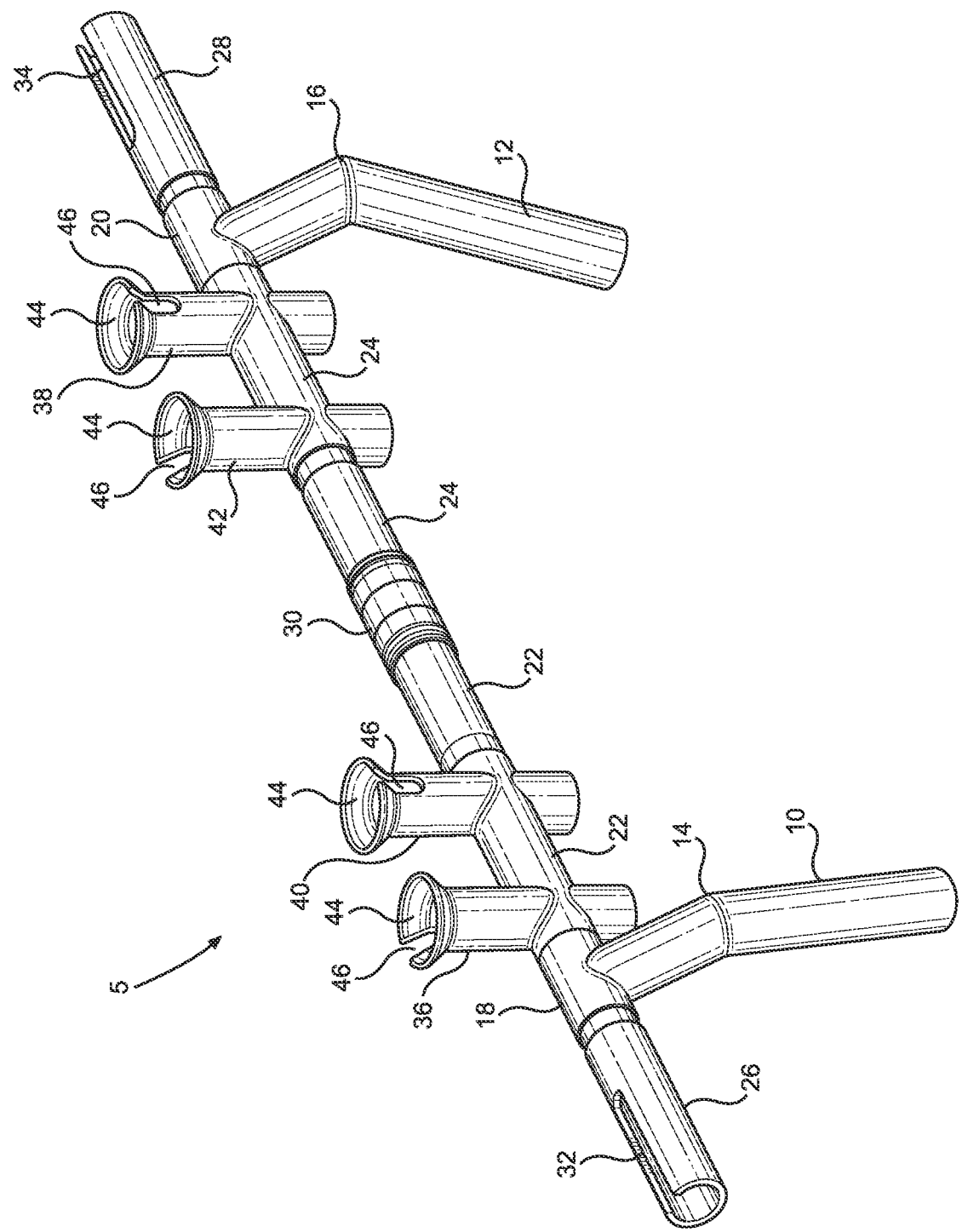
FIG. 5 is perspective view of a third embodiment of a kayak rack.
Figure 6:
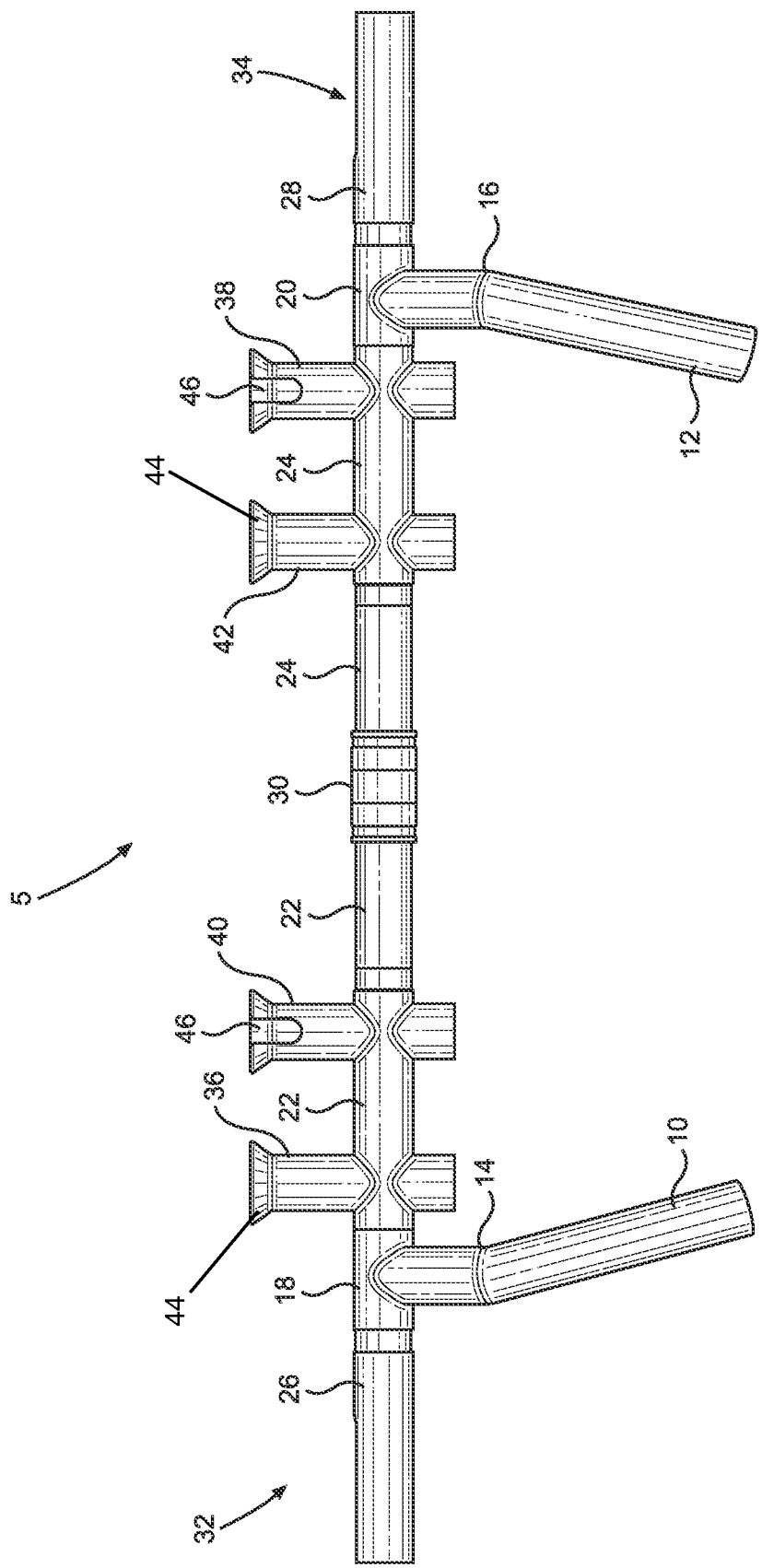
FIG. 6 is a rear elevation view of a third embodiment of kayak rack.
Figure 7:
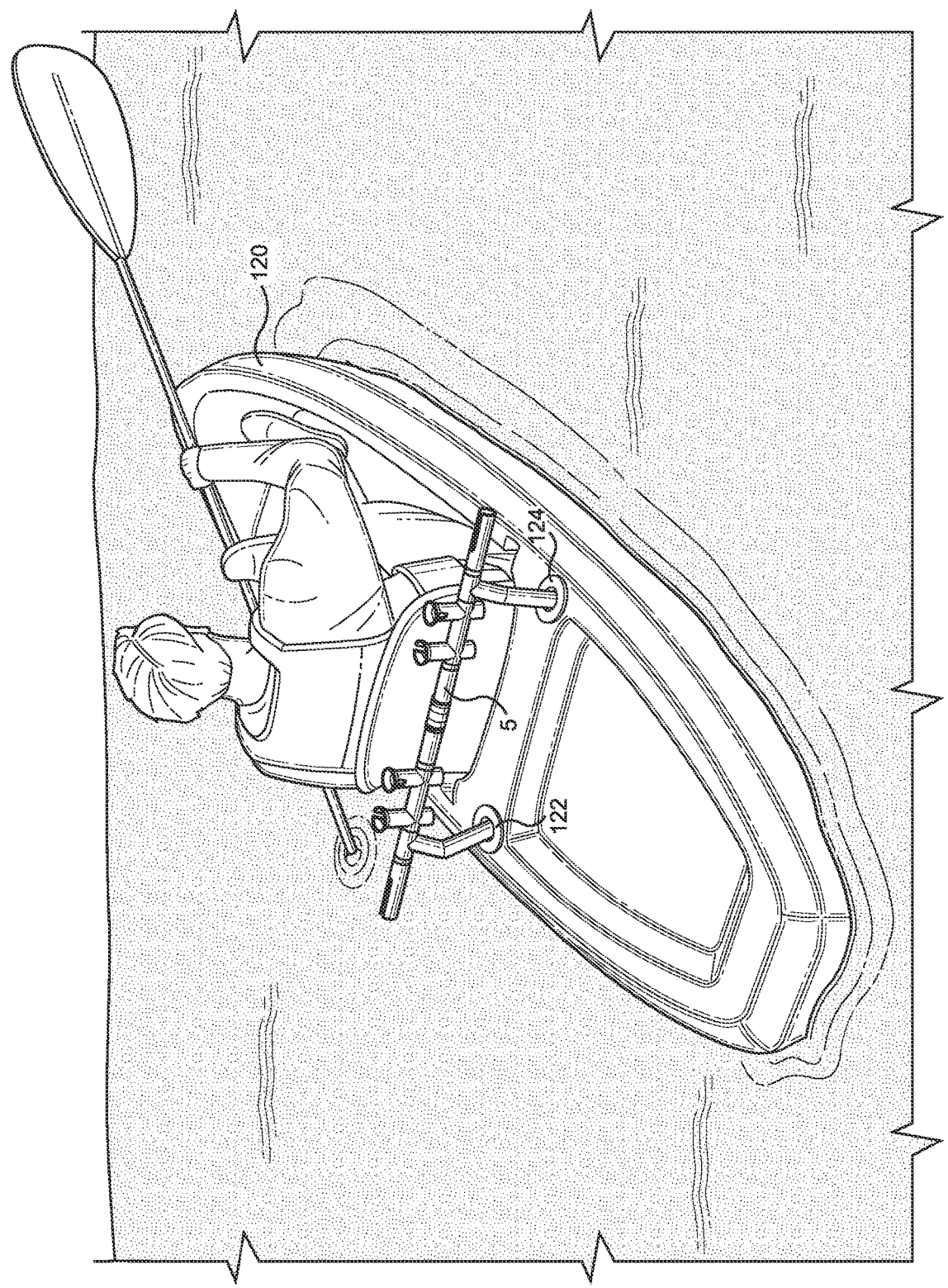
FIG. 7 is a perspective view of a kayak rack installed onto a kayak.

The second end of the flexible support coupling 30 is rigidly attached to or connected to the first end of second inner support beam section 24 so that the longitudinal axis of flexible support coupling 30 is parallel and coincident with that of the second inner support beam section 24. Rigid attachment may be accomplished by any known means such as: weld, glue, epoxy, adhesive, clamps, hose clamps, bolts, screws, rivets, clips, snaps, pins, or fasteners. This attachment or connection completes the construction of the base mode of kayak rack 5. The base mode of kayak rack 5 is depicted in FIGS. 3-4.

The flexible support coupling 30 is a key component of kayak rack 5 because it allows the left hand sub assembly to pivot or move slightly with respect to the right hand sub assembly.

The left hand sub assembly is defined as the assembly of the first stanchion section 10, the first elbow section 14, the first T section 18, the first inner support beam section 22, and the first outer support beam section 26. The right hand sub assembly is defined as the assembly of the second stanchion section 12, the second elbow section 16, the second T section 20, the second inner support beam section 24, and the second outer support beam section 28.

With the flexible support coupling 30 attached and connected properly, the second end of the first inner support beam section 22 may pivot slightly about the mid-point of the flexible support coupling 30 and the first end of the second inner support beam section 24 may pivot slightly about the mid-point of the flexible support coupling 30.

This ability of the left hand sub assembly to pivot about the right hand sub assembly allows for the kayak rack 5 to be properly installed within a pair of left and right fishing rod holders 122,124. As stated above, the longitudinal axes of the left and right fishing rod holders 122,124 are askew or non-parallel from each other. Thus, the first stanchion section 10 could not be inserted into the left fishing rod holder 122 and the second stanchion section 12 could not be inserted into the right fishing rod holder 124 without bending or rotating the left hand sub assembly relative to the right hand sub assembly, and vice versa, to allow the longitudinal axis of the first stanchion section 10 to temporarily align with the longitudinal axis of the left fishing rod holder 122 and the longitudinal axis of the second stanchion section 12 to temporarily align with the longitudinal axis of the right fishing rod holder 124 to allow the stanchions 10,12 to slide all the way into the fishing rod holders 122,124. The bending or rotating of the left hand sub assembly relative to the right hand sub assembly allows the stanchions 10,12 to slide into the fishing rod holders 122,124. Without bending or rotating the left hand sub assembly relative to the right hand sub assembly, the stanchions 10,12 would not slide into the fishing rod holders 122,124.

Similarly, this ability of the left hand sub assembly to pivot about the right hand sub assembly allows for the kayak rack 5 to be properly removed from a pair of left and right fishing rod holders 122,124. The first stanchion section 10 could not be removed from the left fishing rod holder 122 and the second stanchion section 12 could not be removed from the right fishing rod holder 124 without bending or rotating the left hand sub assembly relative to the right hand sub assembly, and vice versa, to allow the longitudinal axis of the first stanchion section 10 to temporarily align with the longitudinal axis of the left fishing rod holder 122 and the longitudinal axis of the second stanchion section 12 to temporarily align with the longitudinal axis of the right fishing rod holder 124 to allow the stanchions 10,12 to slide out of the fishing rod holders 122,124. The bending or rotating of the left hand sub assembly relative to the right hand sub assembly allows the stanchions 10,12 to slide out of the fishing rod holders 122,124. Without bending or rotating the left hand sub assembly relative to the right hand sub assembly, the stanchions 10,12 would not slide out of the fishing rod holders 122,124.

The askew-ness or non-parallel aspect of the longitudinal axes of the left and right fishing rod holders 122,124 also makes the attachment or connection of the kayak rack 5 to the kayak 120 very sturdy, stable, and rugged. With this arrangement, kayak rack 5 cannot be pulled up, lifted up, or removed from the kayak 120 because the sides of the stanchions 10,12 push against the sides of the askew fishing rod holders 122,124 so that these forces or friction forces firmly hold the stanchions 10,12 within the fishing rod holders 122,124. In order to remove the kayak rack 5 from the kayak 120, the left hand sub assembly must be systematically pushed, pulled, or rotated about the right hand sub assembly or vice versa to effectively unlock the kayak rack 5 and remove it from the kayak 120.

Figure 8:
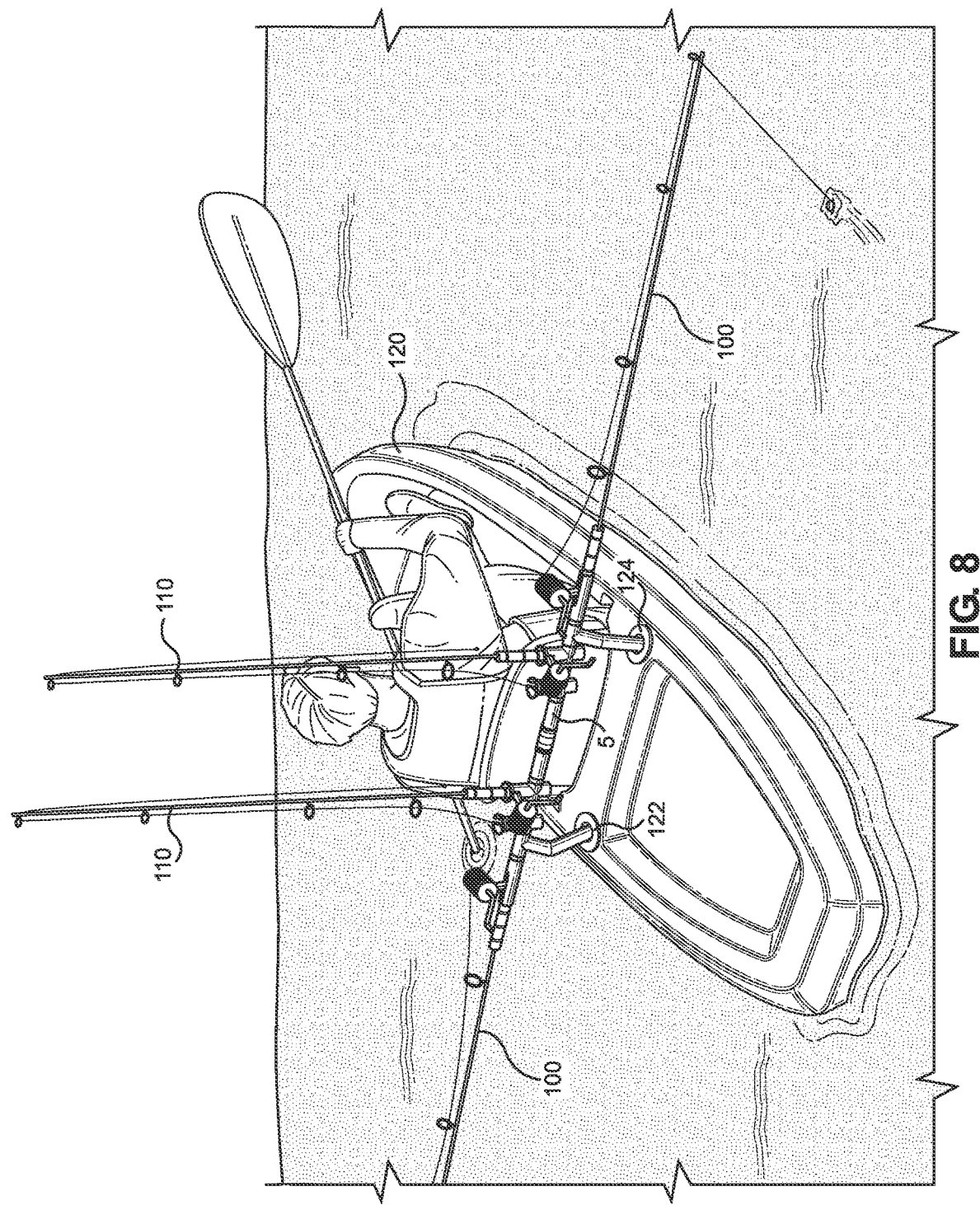
FIG. 8 is a perspective view of a kayak rack installed onto a kayak with fishing poles attached to fishing reel slots and fishing poles attached to storage cups.

In other embodiments, kayak rack 5 may further comprise: a first fishing reel slot 32. First fishing reel slot 32 is a slot, groove, or channel on the outer surface of the first outer support beam section 26 at the first end of the first outer support beam section 26. In these embodiments, first outer support beam section 26 must be hollow, so the first fishing reel slot 32 is an opening into the hollow center of first outer support beam section 26. First fishing reel slot 32 has a first end, a second end, a width, a length, and a longitudinal axis. The first end of first fishing reel slot 32 breaks through or breaks out of the first end of the first outer support beam section 26. The width of first fishing reel slot 32 is about 0.25 to 4 inches. The length of first fishing reel slot 32 is about 1 to 10 inches. The longitudinal axis of first fishing reel slot 32 runs from the first end to the second end of first fishing reel slot 32. First fishing reel slot 32 is a slot, groove, or channel on the outer surface of the first outer support beam section 26, so its longitudinal axis is parallel with that of first outer support beam section 26. First fishing reel slot 32 functions to help hold a fishing pole 100 onto the kayak 120 wherein the fishing pole 110 is being used for fishing as opposed to just being held for storage. The fishing pole 100 is inserted into the first end of the first outer support beam section 26 so that the reel on the fishing pole 100 slides into the first fishing reel slot 32 and is seated onto the second end of the first fishing reel slot 32 as depicted in FIG. 8.

In other embodiments, kayak rack 5 may further comprise: a second fishing reel slot 34. Second fishing reel slot 34 is a slot, groove, or channel on the outer surface of the second outer support beam section 28 at the second end of the second outer support beam section 28. In these embodiments, second outer support beam section 28 must be hollow, so the second fishing reel slot 34 is an opening into the hollow center of second outer support beam section 28. Second fishing reel slot 34 has a first end, a second end, a width, a length, and a longitudinal axis. The second end of second fishing reel slot 34 breaks through or breaks out of the second end of the second outer support beam section 28. The width of second fishing reel slot 34 is about 0.25 to 4 inches. The length of second fishing reel slot 34 is about 1 to 10 inches. The longitudinal axis of second fishing reel slot 34 runs from the first end to the second end of second fishing reel slot 34. Second fishing reel slot 34 is a slot, groove, or channel on the outer surface of the second outer support beam section 28, so its longitudinal axis is parallel with that of first outer support beam section 26. Second fishing reel slot 34 functions to help hold a fishing pole 100 onto the kayak 120 wherein the fishing pole 110 is being used for fishing as opposed to just being held for storage. The fishing pole 100 is inserted into the second end of the second outer support beam section 28 so that the reel on the fishing pole 100 slides into the second fishing reel slot 34 and is seated onto the second end of the second fishing reel slot 34 as depicted in FIG. 8.

First and second fishing rod slots 32,34 offer a huge advantage over the existing, original equipment manufacturer's fishing rod holders 122,124 because the first and second fishing rod slots 32,34 hold fishing poles 100 at a horizontal position as depicted whereas the original equipment manufacturer's fishing rod holders 122,124 hold the fishing poles 100 in a near vertical position. Every fisherman knows that a horizontal positioned fishing rod is better for fishing and trolling than that of a vertical positioned fishing rod.

In other embodiments, kayak rack 5 may further comprise: a first storage cup 36. First storage cup 36 is a rigid cylinder, cylindrical socket, or hollow shaped cylindrical member. First storage cup 36 has an upper end, a lower end, an inner diameter, a length, and a longitudinal axis. The upper end of first storage cup 36 is open. The lower end of first storage cup 36 is open. The inner diameter of first storage cup 36 is about 0.25 to 4 inches. The length of first storage cup 36 is about 2 to 20 inches. The longitudinal axis of first storage cup 36 runs from the lower end to the upper end of first storage cup 36. The longitudinal axis of first storage cup 36 is vertical. The upper end of first storage cup 36 has a flared or enlarged rim 44. The flared or enlarged rim 44 is a widened end or funneled end that tapers outward to allow for easier inserting of a handle or a pole into the first storage cup 36 for storage of the fishing pole 110. The upper end of first storage cup 36 also has a storage reel slot 46. Storage reel slot 46 has a first end, a second end, a width, a length, and a longitudinal axis. The first end of storage reel slot 46 breaks through or breaks out of the upper end of the first storage cup 36. The width of storage reel slot 46 is about 0.25 to 4 inches. The length of storage reel slot 46 is about 1 to 10 inches. The longitudinal axis of storage reel slot 46 runs from the first end to the second end of storage reel slot 46. Storage reel slot 46 is a slot, groove, or channel on the outer surface of the storage cup 36, so its longitudinal axis is parallel with that of storage cup 36. First storage cup 36 is rigidly attached to or connected to the first inner support beam 22 so that the longitudinal axis of the first storage cup 36 is perpendicular to the longitudinal axis of the first inner support beams 22, the lower end of the first storage cup 36 is positioned below the first inner support beams 22, and the upper end of the first storage cup 36 is positioned above the first inner support beam 22. First storage cup 36 functions to hold or retain a fishing pole 110, fishing net, fishing gaff, light mast, flag, or anything with a pole or handle. The pole, handle or fishing pole 110 is inserted into upper end of first storage cup 36 so that the reel on the fishing pole 110 slides into storage reel slot 46 and is seated onto the second end of the storage reel slot 46 as depicted in FIG. 8.

In other embodiments, kayak rack 5 may further comprise: a second storage cup 38. Second storage cup 38 is a rigid cylinder, cylindrical socket, or hollow shaped cylindrical member. Second storage cup 38 has an upper end, a lower end, an inner diameter, a length, and a longitudinal axis. The upper end of second storage cup 38 is open. The lower end of second storage cup 38 is open. The inner diameter of second storage cup 38 is about 0.25 to 4 inches. The length of second storage cup 38 is about 2 to 20 inches. The longitudinal axis of second storage cup 38 runs from the lower end to the upper end of second storage cup 38. The longitudinal axis of second storage cup 38 is vertical. The upper end of second storage cup 38 has a flared or enlarged rim 44. The flared or enlarged rim 44 is a widened end or funneled end that tapers outward to allow for easier inserting of a handle or pole into the second storage cup 38 for storage of the fishing pole 110. The upper end of second storage cup 38 also has a storage reel slot 46. Storage reel slot 46 has a first end, a second end, a width, a length, and a longitudinal axis. The first end of storage reel slot 46 breaks through or breaks out of the upper end of the second storage cup 38. The width of storage reel slot 46 is about 0.25 to 4 inches. The length of storage reel slot 46 is about 1 to 10 inches. The longitudinal axis of storage reel slot 46 runs from the first end to the second end of storage reel slot 46. Storage reel slot 46 is a slot, groove, or channel on the outer surface of the storage cup 38, so its longitudinal axis is parallel with that of storage cup 38. Second storage cup 38 is rigidly attached to or connected to the second inner support beam 24 so that the longitudinal axis of the second storage cup 38 is perpendicular to the longitudinal axis of the second inner support beams 24, the lower end of the second storage cup 38 is positioned below the second inner support beams 24, and the upper end of the second storage cup 38 is positioned above the second inner support beam 24. Second storage cup 38 functions to hold or retain a fishing pole 110, fishing net, fishing gaff, light mast, flag, or anything with a pole or handle. The pole, handle, or fishing pole 110 is inserted into upper end of second storage cup 38 so that the reel on the fishing pole 110 slides into storage reel slot 46 and is seated onto the second end of the storage reel slot 46 as depicted in FIG. 8.

In other embodiments, kayak rack 5 may further comprise: a third storage cup 40. Third storage cup 40 is a rigid cylinder, cylindrical socket, or hollow shaped cylindrical member. Third storage cup 40 has an upper end, a lower end, an inner diameter, a length, and a longitudinal axis. The upper end of third storage cup 40 is open. The lower end of third storage cup 40 is open. The inner diameter of third storage cup 40 is about 0.25 to 4 inches. The length of third storage cup 40 is about 2 to 20 inches. The longitudinal axis of third storage cup 40 runs from the lower end to the upper end of third storage cup 40. The longitudinal axis of third storage cup 40 is vertical. The upper end of third storage cup 40 has a flared or enlarged rim 44. The flared or enlarged rim 44 is a widened end or funneled end that tapers outward to allow for easier inserting of a fishing pole 110 into the third storage cup 40 for storage of the fishing pole 110. The upper end of third storage cup 40 also has a storage reel slot 46. Storage reel slot 46 has a first end, a second end, a width, a length, and a longitudinal axis. The first end of storage reel slot 46 breaks through or breaks out of the upper end of the third storage cup 40. The width of storage reel slot 46 is about 0.25 to 4 inches. The length of storage reel slot 46 is about 1 to 10 inches. The longitudinal axis of storage reel slot 46 runs from the first end to the second end of storage reel slot 46. Storage reel slot 46 is a slot, groove, or channel on the outer surface of the storage cup 40, so its longitudinal axis is parallel with that of storage cup 40. Third storage cup 40 is rigidly attached to or connected to the first inner support beam 22 so that the longitudinal axis of the third storage cup 40 is perpendicular to the longitudinal axis of the first inner support beams 22, the lower end of the third storage cup 40 is positioned below the first inner support beams 22, and the upper end of the third storage cup 40 is positioned above the first inner support beam 22.

Third storage cup 40 functions to hold or retain a fishing pole 110, fishing net, fishing gaff, light mast, flag, or anything with a pole or handle. The pole, handle, or fishing pole 110 is inserted into upper end of third storage cup 40 so that the reel on the fishing pole 110 slides into storage reel slot 46 and is seated onto the second end of the storage reel slot 46 as depicted in FIG. 8.

In other embodiments, kayak rack 5 may further comprise: a fourth storage cup 42. Fourth storage cup 42 is a rigid cylinder, cylindrical socket, or hollow shaped cylindrical member. Fourth storage cup 42 has an upper end, a lower end, an inner diameter, a length, and a longitudinal axis. The upper end of fourth storage cup 42 is open. The lower end of fourth storage cup 42 is open. The inner diameter of fourth storage cup 42 is about 0.25 to 4 inches. The length of fourth storage cup 42 is about 2 to 20 inches. The longitudinal axis of fourth storage cup 42 runs from the lower end to the upper end of fourth storage cup 42. The longitudinal axis of fourth storage cup 42 is vertical. The upper end of fourth storage cup 42 has a flared or enlarged rim 44. The flared or enlarged rim 44 is a widened end or funneled end that tapers outward to allow for easier inserting of a fishing pole 110 into the fourth storage cup 42 for storage of the fishing pole 110. The upper end of fourth storage cup 42 also has a storage reel slot 46. Storage reel slot 46 has a first end, a second end, a width, a length, and a longitudinal axis. The first end of storage reel slot 46 breaks through or breaks out of the upper end of the fourth storage cup 42. The width of storage reel slot 46 is about 0.25 to 4 inches. The length of storage reel slot 46 is about 1 to 10 inches. The longitudinal axis of storage reel slot 46 runs from the first end to the second end of storage reel slot 46. Storage reel slot 46 is a slot, groove, or channel on the outer surface of the storage cup 42, so its longitudinal axis is parallel with that of storage cup 42. Fourth storage cup 42 is rigidly attached to or connected to the second inner support beam 24 so that the longitudinal axis of the fourth storage cup 42 is perpendicular to the longitudinal axis of the second inner support beams 24, the lower end of the fourth storage cup 42 is positioned below the second inner support beams 24, and the upper end of the fourth storage cup 42 is positioned above the second inner support beam 24. Fourth storage cup 42 functions to hold or retain a fishing pole 110, fishing net, fishing gaff, light mast, flag, or anything with a pole or handle. The pole, handle, or fishing pole 110 is inserted into upper end of fourth storage cup 42 so that the reel on the fishing pole 110 slides into storage reel slot 46 and is seated onto the second end of the storage reel slot 46 as depicted in FIG. 8.

What is claimed is:

1. A kayak storage rack comprising: a first stanchion section; a second stanchion section; a first elbow section; a second elbow section; a first T section; a second T section; a first inner support beam section, a second inner support beam section; a first outer support beam section; a second outer support beam section; and a flexible support coupling, wherein said first stanchion section is a rigid cylindrical member, said first stanchion section has a first end, a second end, an outer diameter, an outer surface, a length, and a longitudinal axis, said second stanchion section is a rigid cylindrical member, said second stanchion section has a first end, a second end, an outer diameter, an outer surface, a length, and a longitudinal axis, said first elbow section is a rigid elbow-shaped or bent cylindrical member that is angled at a 30 to 60 degree angle, said first elbow section has a first segment, a first segment outer diameter, a first segment length, a first segment longitudinal axis, a second segment, a second segment outer diameter, a second segment length, and a second segment longitudinal axis, said second elbow section is a rigid elbow-shaped or bent cylindrical member that is angled at a 30 to 60 degree angle, said second elbow section has a first segment, a first segment outer diameter, a first segment length, a first segment longitudinal axis, a second segment, a second segment outer diameter, a second segment length, and a second segment longitudinal axis, said first T section is a rigid T-shaped member, said first T section has a base segment, a first segment, and a second segment, said second T section is a rigid T-shaped member, said second T section has a base segment, a first segment, and a second segment, said first inner support beam section is a rigid cylindrical member, said first inner support beam section has a first end, a second end, an outer diameter, an outer surface, a length, and a longitudinal axis, said second inner support beam section is a rigid cylindrical member, said second inner support beam section has a first end, a second end, an outer diameter, an outer surface, a length, and a longitudinal axis, said first outer support beam section is a rigid cylindrical member, said first outer support beam section has a first end, a second end, an outer diameter, an outer surface, a length, and a longitudinal axis, said second outer support beam section is a rigid cylindrical member, said second outer support beam section has a first end, a second end, an outer diameter, an outer surface, a length, and a longitudinal axis, said flexible support coupling is a hollow flexible cylindrical member, said flexible support coupling has a first end, a second end, a mid-point, an inner diameter, an outer diameter, a length, and a longitudinal axis, said second end of said first segment of said first elbow section is rigidly attached to or connected to said first end of said second segment of said first elbow section so that said longitudinal axis of said first segment is at a 30 to 60 degree angle with said longitudinal axis of said second segment, said second end of said first segment of said second elbow section is rigidly attached to or connected to said first end of said second segment of said second elbow section so that said longitudinal axis of said first segment is at a 30 to 60 degree angle with said longitudinal axis of said second segment, said second end of said first stanchion section is rigidly attached to or connected to said first end of said first segment of said first elbow section so that said longitudinal axis of said first stanchion section is parallel and coincident with said longitudinal axis of said first segment of said first elbow section, said second end of the second stanchion section is rigidly attached to or connected to said first end of said first segment of said second elbow section so that said longitudinal axis of said second stanchion section is parallel and coincident with said longitudinal axis of said first segment of said second elbow section, said second end of said first segment of said first T section is rigidly attached to or connected to said first end of said second segment of said first T section so that said longitudinal axis of said first segment of said first T section is parallel and coincident with said longitudinal axis of said second segment of said first T section, said second end of said base segment of said first T section is rigidly attached to or connected to said first and said second segments of said first T section so that said longitudinal axis of said base segment of said first T section is perpendicular to said longitudinal axes of said first and said second segments of said first T section, said second end of said first segment of said second T section is rigidly attached to or connected to said first end of said second segment of said second T section so that said longitudinal axis of said first segment of said second T section is parallel and coincident with said longitudinal axis of said second segment of said second T section, said second end of said base segment of said second T section is rigidly attached to or connected to said first and said second segments of said second T section so that said longitudinal axis of said base segment of said first T section is perpendicular to said longitudinal axes of said first and said second segments of said second T section, said second end of said second segment of said first elbow section is rigidly attached to or connected to said first end of said base segment of said first T section so that said longitudinal axis of said second segment of said first elbow section is parallel and coincident with said longitudinal axis of said base segment of said first T section and said longitudinal axis of said first segment of said first elbow section forms an acute angle with said longitudinal axis of said first segment of said second elbow section, said second end of said second segment of said second elbow section is rigidly attached to or connected to said first end of said base segment of said second T section so that said longitudinal axis of said second segment of said second elbow section is parallel and coincident with said longitudinal axis of the base segment of said second T section and said longitudinal axis of said first segment of said second elbow section forms an acute angle with said longitudinal axis of said first segment of said first elbow section, said first end of said first inner support beam section is rigidly attached to or connected to said second end of said second segment said first T section so that said longitudinal axis of said first inner support beam section is parallel and coincident with said longitudinal axis of said second segment of said first T section, said second end of said second inner support beam section is rigidly attached to or connected to said first end of said first segment of said second T section so that said longitudinal axis of said second inner support beam section is parallel and coincident with said longitudinal axis of said first segment of said second T section, said second end of said first outer support beam section is rigidly attached to or connected to said first end of said first segment of said first T section so that said longitudinal axis of said first outer support beam section is parallel and coincident with said longitudinal axis of said first segment of said first T section, said first end of said second outer support beam section is rigidly attached to or connected to said second end of said second segment of said second T section so that said longitudinal axis of said second outer support beam section is parallel and coincident with said longitudinal axis of said second segment of said second T section, said first end of said flexible support coupling is rigidly attached to or connected to said second end of said first inner support beam section so that said longitudinal axis of said flexible support coupling is parallel and coincident with said longitudinal axis of said first inner support beam section, and said second end of said flexible support coupling is rigidly attached to or connected to said first end of said second inner support beam section so that said longitudinal axis of said flexible support coupling is parallel and coincident with said longitudinal axis of said second inner support beam section.

2. A kayak storage rack as recited in claim 1 further comprising a first fishing reel slot, wherein said first fishing reel slot is a slot, groove, or channel on the outer surface of said first outer support beam section at said first end of said first outer support beam section.

3. A kayak storage rack as recited in claim 1 further comprising a second fishing reel slot, wherein said second fishing reel slot is a slot, groove, or channel on the outer surface of said second outer support beam section at said second end of said second outer support beam section.

4. A kayak storage rack as recited in claim 1 further comprising a first storage cup, wherein said first storage cup is a rigid cylinder, cylindrical socket, or hollow shaped cylindrical member rigidly attached to or connected to said first inner support beam.

5. A kayak storage rack as recited in claim 1 further comprising a second storage cup, wherein said second storage cup is a rigid cylinder, cylindrical socket, or hollow shaped cylindrical member rigidly attached to or connected to said second inner support beam.

\* \* \* \* \*